(12) United States Patent
Miettinen

(10) Patent No.: US 7,023,712 B2
(45) Date of Patent: Apr. 4, 2006

(54) COOLING ARRANGEMENT IN FREQUENCY CONVERTER

(75) Inventor: Osmo Miettinen, Vaasa (FI)

(73) Assignee: Vacon Oyj, Vaasa (FI)

( * ) Notice: Subject to any disclaimer, the term of this patent is extended or adjusted under 35 U.S.C. 154(b) by 186 days.

(21) Appl. No.: 10/683,278

(22) Filed: Oct. 14, 2003

(65) Prior Publication Data

US 2004/0119439 A1    Jun. 24, 2004

(30) Foreign Application Priority Data

Oct. 17, 2002   (FI) ................................. 20021856

(51) Int. Cl.
*H05K 7/20*   (2006.01)
(52) U.S. Cl. .................. 363/34; 363/141; 361/678; 361/695
(58) Field of Classification Search ................ 361/678, 361/695; 363/34, 37, 141
See application file for complete search history.

(56) References Cited

U.S. PATENT DOCUMENTS

| | | | |
|---|---|---|---|
| 5,485,350 A * | 1/1996 | Hecht et al. ................. | 361/692 |
| 5,825,642 A * | 10/1998 | Ishii et al. ................... | 363/141 |
| 6,188,189 B1 | 2/2001 | Blake ......................... | 318/471 |
| 6,198,642 B1 * | 3/2001 | Kociecki ..................... | 363/37 |
| 6,236,184 B1 | 5/2001 | Baker ......................... | 310/803 |
| 6,278,080 B1 * | 8/2001 | Moriguchi et al. ....... | 219/130.1 |
| 6,867,970 B1 * | 3/2005 | Muller et al. ............... | 361/695 |
| 2002/0063476 A1 | 5/2002 | Rolls et al. ................. | 307/117 |

FOREIGN PATENT DOCUMENTS

| | | |
|---|---|---|
| JP | A 60-131094 | 7/1985 |
| WO | WO 01/05516 A1 | 1/2001 |

* cited by examiner

*Primary Examiner*—Jeffrey Sterrett
(74) *Attorney, Agent, or Firm*—Oliff & Berridge, PLC

(57) ABSTRACT

The invention relates to a cooling arrangement in a frequency converter, the arrangement being configured to convey heat generated at the frequency converter to a space surrounding the frequency converter, comprising a power part (10) of the frequency converter, a control part (20) and cooling means, comprising a cooling motor (31) and a transfer means (32) for producing cooling. In accordance with the invention, a cooling frequency converter is arranged in connection with the frequency converter to control the cooling means. The power part of the cooling frequency converter comprises a rectifier (11) of the frequency converter, an intermediate circuit (12) of the frequency converter as well as a unique power unit (43) of the cooling frequency converter. The power unit (43) is arranged between the intermediate circuit (12) and the cooling motor (31) in order to supply power to the cooling motor (31), the cooling frequency converter having a control unit (50) connected to the power unit (43) and controlling the same.

11 Claims, 4 Drawing Sheets

COOLING ARRANGEMENT IN FREQUENCY CONVERTER

BACKGROUND OF THE INVENTION

The invention relates to a cooling arrangement in a frequency converter.

A frequency converter is a power electronics device for steplessly adjusting the rotation speed of an alternating-current motor, such as a short circuit motor. The rotation speed of a short circuit motor is proportional to frequency, so by steplessly changing the frequency of a motor its rotation speed changes correspondingly. A frequency converter may be used for adjusting the acceleration and deceleration as well as the braking and reversing of a motor. Based on its function, a frequency converter may be divided into four different parts:

a rectifier for rectifying a received alternating voltage,
an intermediate circuit for filtering a direct voltage received from the rectifier,
an inverter for changing the rectified and filtered voltage back to an alternating voltage, and
a control unit for controlling the operation of the inverter on the basis of received measurement information to enable a correct frequency to be provided for the voltage to be fed to a motor.

In such frequency converters power loss occurs, causing by such lost capacity a large amount of heat that should be removed in order to protect the components of the frequency converters. The demand for cooling air of frequency converters varies considerably: for small frequency converters 70 $m^3/h$ may suffice, but the demand increases significantly, the largest frequency converters requiring up to 8000 $m^3/h$. In order to protect the frequency converters a transfer means, e.g. a blower, is used, which is arranged to conduct the heat generated in a frequency converter to a space surrounding the frequency converter by means of an air flow.

Previously it has been known to use constant speed fans for cooling electrical devices. This implementation is successful, but the speed of a fan has to be set according to the worst possible situation, which means that the cooling capacity is unnecessarily high. Nowadays a need exists to optimize the efficiency of an electrical device and minimize losses. One way to optimize a device is to try to remove any unnecessary power consumption required for cooling.

In JP60131094 an attempt is made at this by arranging the motor running a cooling fan together with the motor output. In such a case, the speed of the fan operating as a cooler varies together with the motor output. This results in lesser cooling when the speed of the motor is lower and the device needs less cooling. Higher speeds require more cooling, also the fan rotating quicker. In such a cooling arrangement, however, the cooling capacity has to be dimensioned using a certain safety factor since the surrounding conditions are totally ignored during use. The environmental conditions, e.g. the surrounding temperature, around a device may vary up to 50 degrees (−10° to +40°). In many lower temperature cases the power consumption of such a solution is thus unnecessarily high. Thus, a solution wherein cooling is implemented only on the basis of the motor output of a frequency converter does not take the internal temperatures of the frequency converter into account. Neither does the solution take into account a situation where the load is high even at low revolutions. Devices, for instance elevators, exist that require high cooling capacity even at low speeds.

BRIEF DESCRIPTION OF THE INVENTION

An object of the invention is to provide a more accurately adjustable cooling solution for protecting frequency converters producing large amounts of heat while simultaneously optimizing the power consumption required for such protection. The object of the invention is achieved by an arrangement which is characterized by what is disclosed in the independent claim. Preferred embodiments of the invention are disclosed in the dependent claims.

A cooling arrangement of the invention is based on utilizing components of a power part of a frequency converter as well as measurement and control information from a control part of the frequency converter also in the cooling solution.

According to the invention, a second frequency converter, a cooling frequency converter, in a sense, is arranged inside a frequency converter, the second frequency converter, however, utilizing both the measurement information measured by the first frequency converter and some of the components of the first frequency converter.

In the arrangement of the invention, however, in order to enable individual adjustment cooling should have a power unit of its own, such as an inverter which derives its power from an intermediate circuit following a rectifier of a frequency converter. This enables an adjustable cooling arrangement to be implemented by means of as few electrical components as possible.

The control part of a frequent converter already comprises measurement devices for enabling a motor to be adjusted; in such a case, the measurement devices are used e.g. for carrying out a three-phase measurement on the motor from the outgoing phases, and following the temperature of the frequency converter to protect it. Adjustment information for the cooling devices is obtained from the power part of the frequency converter by means of a measurement device. This adjustment information is already available in existing frequency converter solutions since the existing frequency converters have an integral arrangement for monitoring the temperature of the power part, which is used for protecting the frequency converter against potential overheating. Such a temperature sensing element may be e.g. a temperature detector or a thermostat which indicates to an adjustment circuit the temperature of a target to be measured. In the arrangement of the invention, however, this temperature information may be utilized also as adjustment information for cooling.

Since the temperature of the environment of a frequency converter may significantly affect the temperatures of the frequency converter, such temperature-measuring measurement information obtained directly from the power part is thus independent of the load and, consequently, more accurate than e.g. adjustment information based on load current measurement or rotation speed.

Controlling the second power unit by means of a control unit similar to the control part of the frequency converter also enables a nonlinearly operating adjustment to be implemented. This enables the temperature of the power part to be set to a desired level by first cooling the power part less, or not at all, in order to bring the temperature to the desired level.

On the other hand, utilizing the control information received by the control part in a control unit similar to the control part of the frequency converter enables an anticipatory adjustment to be implemented in cooling. According to the invention, the control unit of a cooling frequency converter comprises means for receiving control information also received by the control part, thus enabling an anticipatory adjustment to be implemented on the basis of this control information by means of the devices in the control unit e.g. by increasing the cooling capacity in advance in order to slow down a temperature rise caused by a forthcoming higher load. This enables hunting in adjustment to be decreased in a continuous adjustment, still enabling a stable temperature simultaneously so that the components are not unnecessarily loaded by large variations in temperature.

Such an anticipatory adjustment is particularly advantageous in devices that are subjected to heavier loads irregularly, e.g. elevator apparatuses. The cooling arrangement of the invention enables an anticipatory adjustment to be carried out e.g. on the basis of elevator calls, by raising the cooling level in advance if several elevator calls are already known and, on the other hand, possibly lowering the cooling level earlier if no forthcoming elevator calls are known.

Furthermore, in the cooling system of the invention, no separate adjustable cooling is, in turn, needed for a cooling frequency converter since most of the components are shared ones and a fan is used for cooling the frequency converter in its entirety. If necessary, the cooling of the power unit of the cooling frequency converter may be carried out by cooling ribs; due to the light load, the heat production of the power unit is anyway significantly smaller than that of the inverter of the first frequency converter. If necessary, other protecting components, such as a motor overload protection, motor jam protection or an overheat protection for a device, etc., may also be used for protecting the cooling motor's and the cooling frequency converter's own components. Such a release of heat protection means cutting off electricity to a device; consequently, it is mainly for fault situations only.

In the arrangement of the invention, cooling is provided with a motor and a transfer means, such as a blower or, when using water cooling, a pump-like device, of its own. When extra cooling is needed for one frequency converter, several transfer means may even be arranged in parallel. The connecting points of a cooling motor may also be arranged outside the device, in which case the cooling motor may be placed outside the frequency converter, which means that the cooling motor does not generate heat inside the housing of the frequency converter.

When the transfer means reside outside the frequency converter, the cooling of the frequency converter may be implemented by an external channeling to the inside of the frequency converter. This enables cooling air to be brought in to the frequency converter also from farther away, e.g. from the cooler outdoor air. On the other hand, such a channeling enables the cooling of even several frequency converters to be implemented by means of one frequency converter controlled, high-power motor and a transfer means connected thereto. Although the adjustment may further be implemented by one control part, measurement information is still needed on all frequency converters by using e.g. a bus-type solution (Modbus, Profibus) for delivering the measurement information. In addition, the adjustment of the transfer means then always has to be implemented according to the largest cooling demand.

BRIEF DESCRIPTION OF THE DRAWINGS

The invention is now described in closer detail in connection with a preferred embodiment and with reference to the accompanying drawings, in which.

DETAILED DESCRIPTION OF THE INVENTION

Figure 1:
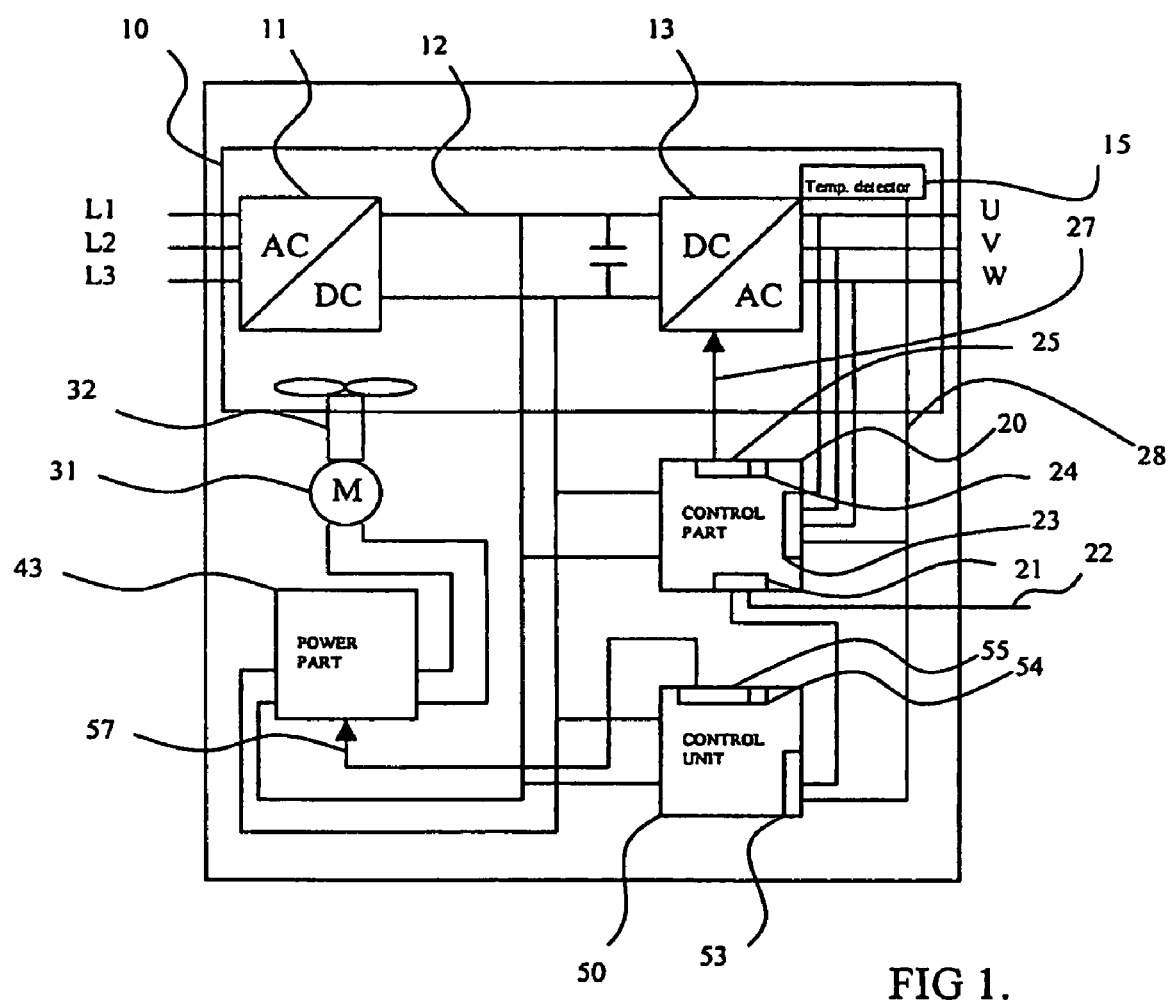
FIG. 1 is a block diagram showing an embodiment wherein a control unit of a cooling frequency converter controls a power unit.

According to FIGS. 1 to 4, in a cooling arrangement a frequency converter comprises a power part 10 comprising a rectifier 11, an intermediate circuit 12 and an inverter 13. The frequency converter further includes a control part 20, connected to the power part 10.

Furthermore, according to FIGS. 1 to 4, the power part 10 and the control part 20 are connected to measurement means 15 for providing measurement information 28 from the power part 10.

The control part 20 comprises means 21 for receiving control information 22 supplied thereto, and means 23 for receiving measurement information, means 24 for producing adjustment information 27 by utilizing the received measurement information 28 and the supplied control information, and means 25 for transmitting the adjustment information 27 to the inverter 13 for controlling it. These means are I/O connections of frequency converters. The connections may be analogue or digital. The measurement information and the adjustment information may be e.g. current signals or voltage signals. A bus-type solution, such as Modbus or Profibus, may also be used for delivering the measurement information and the adjustment information.

The frequency converter also comprises cooling means, including a cooling motor 31 and a transfer means 32 for producing cooling. A cooling frequency converter is arranged in connection with the frequency converter to control the cooling means, the power part 10 of the cooling frequency converter comprising a rectifier 11 of the frequency converter and an intermediate circuit 12 of the frequency converter as well as a unique power unit 43 of the cooling frequency converter, the power unit 43 being arranged between the intermediate circuit 12 and the cooling motor 31 in order to supply power to the cooling motor 31, the cooling frequency converter having a control unit 50 connected to the power unit 43 and controlling the same.

The control unit 50 of the cooling frequency converter is connected to the control part 20 of the frequency converter for delivering the measurement information 28 and the control information 22 from the control part 20 to the control unit 50. The control unit 50 comprises reception means 53, such as I/O means or bus-type connections, for receiving the measurement information 28 and the control information 22, as well as control means 54 for producing adjustment information 57 on the basis of the received measurement information 28 and control information 22. On the basis of the measurement information 28 and the control information 22 the control means 54 may implement the adjustment information 57 to adjust cooling nonlinearly when it is desired to achieve a predetermined temperature, and the cooling may be adjusted anticipatorily based on the forthcoming but already known control information 22. The control unit further comprises transmission means 55 for transmitting this adjustment information 57 to the power unit 43 for controlling the same.

Power is supplied to the control unit 50 from the intermediate circuit 12 of the power part. The power supply of the control part may also be an external power supply, such as a battery. This enables the control part to be used also when the rest of the device is without power.

Figure 2:
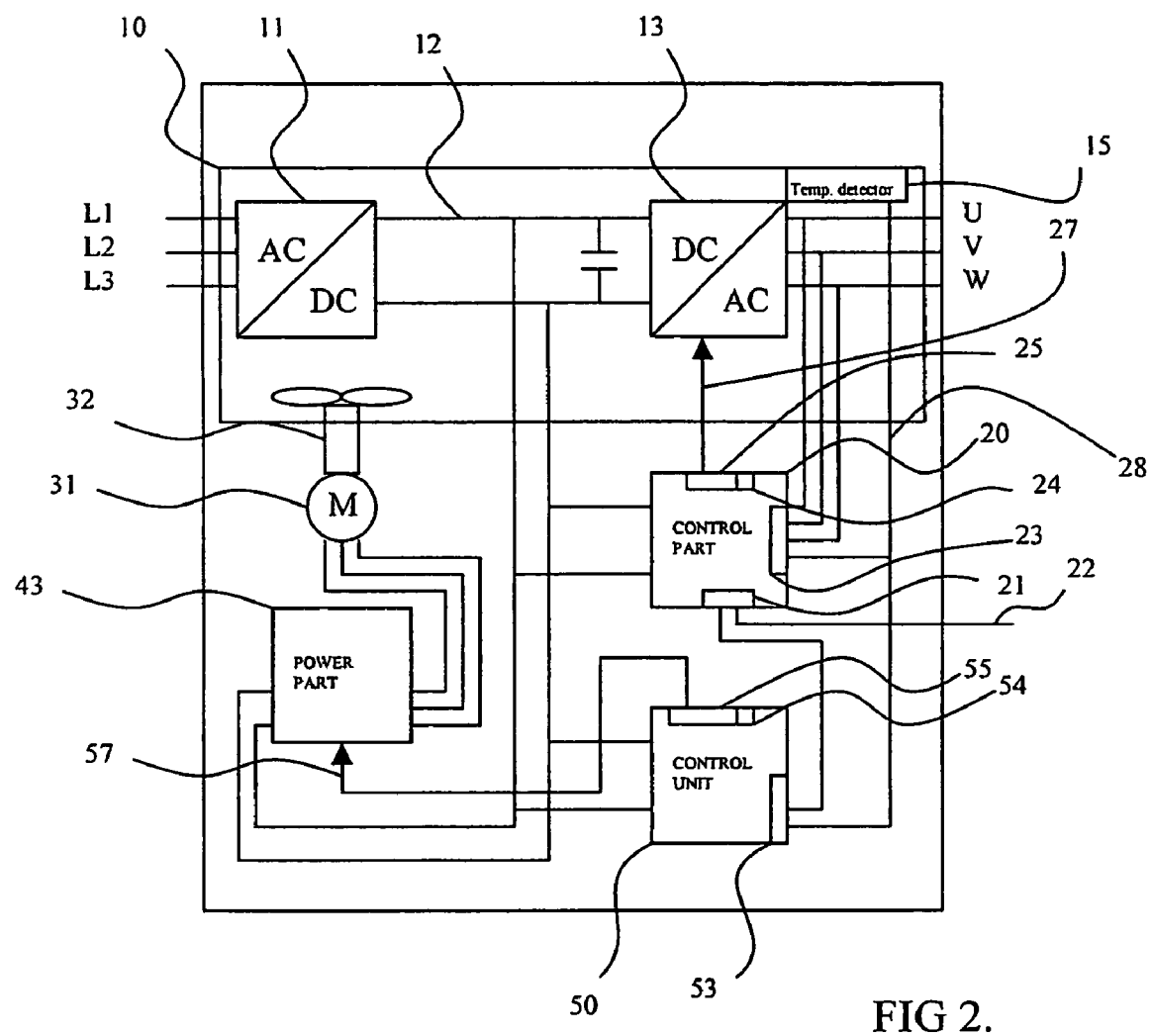
FIG. 2 is a block diagram showing an arrangement according to the embodiment shown in FIG. 1, wherein the control unit controls an inverter in order to control a three-phase short circuit motor.
Figure 3:
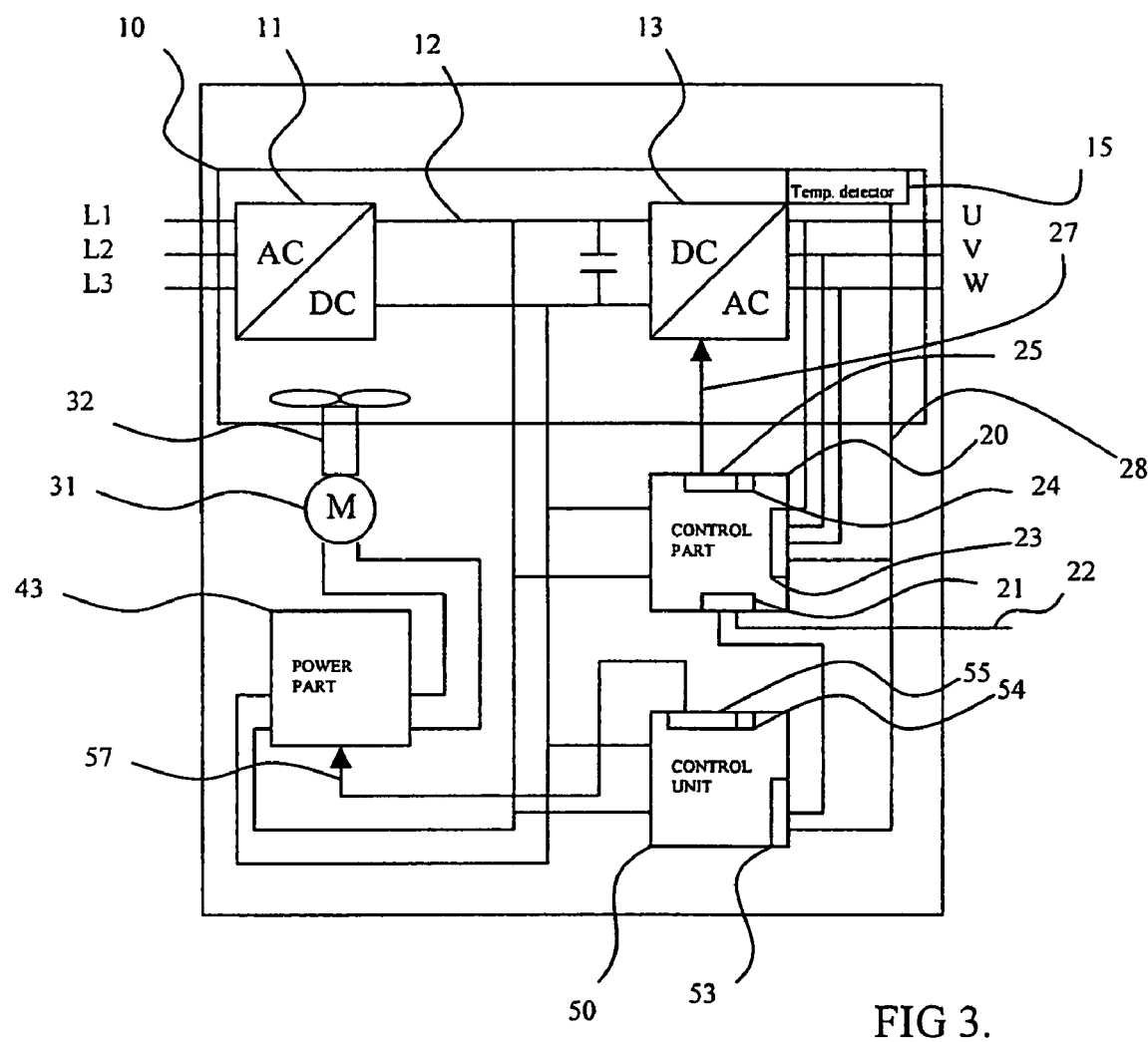
FIG. 3 is a block diagram showing an arrangement according to the embodiment shown in FIG. 1, wherein the control unit controls the inverter in order to control a single-phase short circuit motor.

FIGS. 2 and 3 show an embodiment wherein the power unit 43 of the cooling frequency converter is an inverter controlled by adjustment information 57. Pulse Width Modulation (PWM), for instance, may be used for controlling the inverter, in which case both the voltage and the frequency of the output of the inverter are controlled by a PWM control. Then, the intermediate circuit 12 has a constant full voltage, and the voltage going to the cooling motor 31 is adjusted by cutting the voltage pulse supplied thereto such that the voltage of the motor is suitable with respect to the frequency.

When an inverter is used as the power unit, the cooling motor may be an AC motor. In FIG. 2, a three-phase short circuit motor is shown as the cooling motor 31, and in FIG. 3, the cooling motor 31 is a single-phase short circuit motor.

Figure 4:
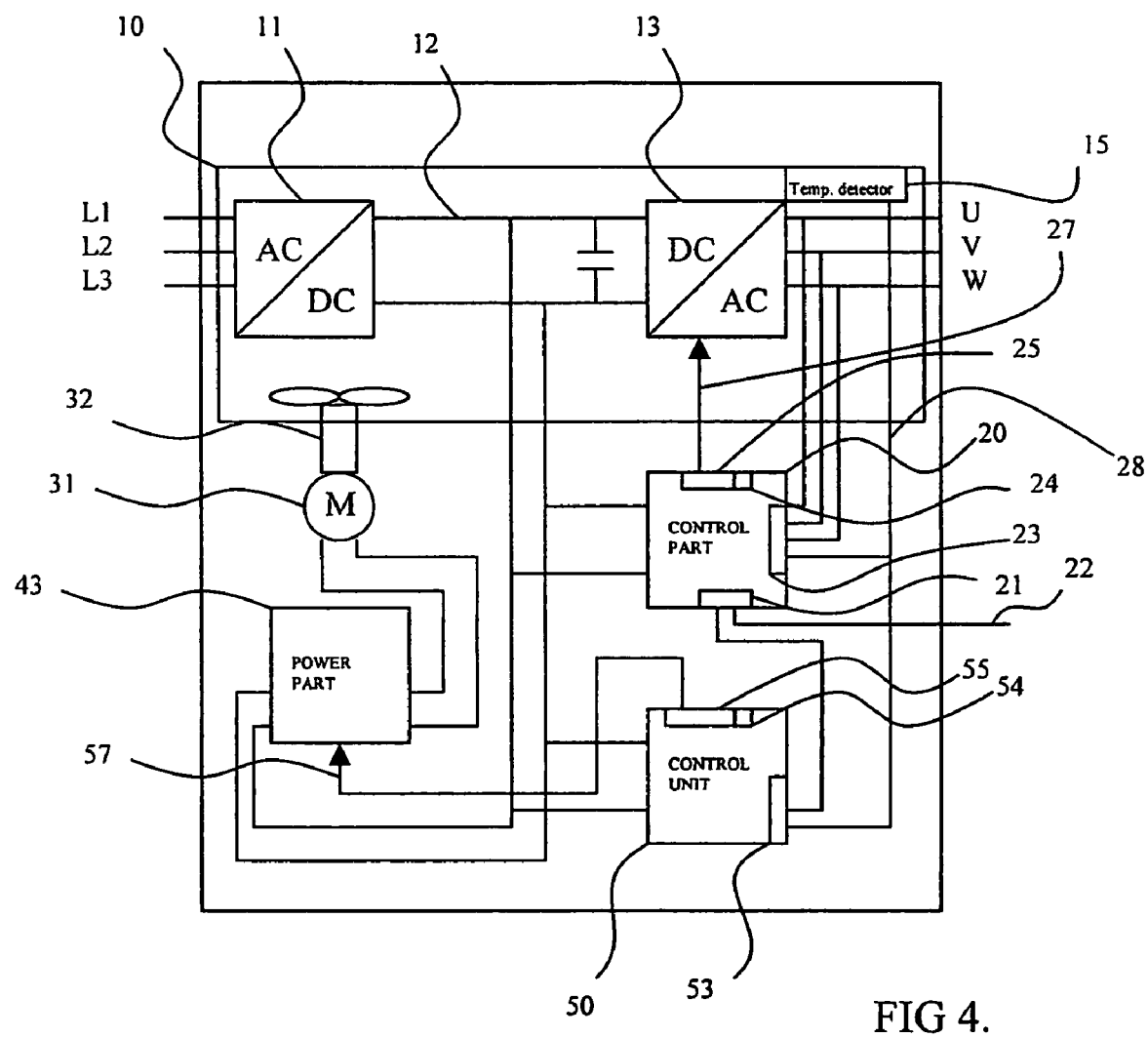
FIG. 4 is a block diagram showing an arrangement according to the embodiment shown in FIG. 1, wherein the control unit controls a switched-mode power supply in order to control a DC motor.

FIG. 4 shows an arrangement comprising a control unit 50 controlling a power unit 43, such as a switched-mode power supply, for controlling a DC motor 31. The DC motor 31 is preferably a permanent magnet motor but it may equally well be an iron-free DC motor or a brushless DC motor. A permanent magnet motor has quite a good efficiency so that at low load it does not in itself cause a very large amount of lost capacity and thus generate heat inside the housing. The speed of rotation of a permanent magnet motor is directly proportional to a control voltage, so it is thus quite easy to control.

It is obvious to one skilled in the art that as technology advances, the basic idea of the invention can be implemented in many different ways. The invention and its embodiments are thus not restricted to the examples described above but may vary within the scope of the claims.

What is claimed is:

1. A cooling arrangement in a frequency converter, the arrangement being configured to convey heat generated at the frequency converter to a space surrounding the frequency converter, comprising:
   a power part of the frequency converter, comprising a rectifier, an intermediate circuit and an inverter,
   a control part of the frequency converter, connected to the power part,
   measurement means connected to the power part and to the control part for producing measurement information from the power part, and
   the control part comprising means for receiving control information supplied thereto and means for receiving measurement information, means for producing adjustment information by utilizing the received measurement information and the supplied control information, and means for transmitting this adjustment information to the inverter for controlling it, and
   cooling means comprising a cooling motor and a transfer means for producing cooling, wherein in the arrangement:
   a cooling frequency converter is arranged in connection with the frequency converter to control the cooling means, the cooling frequency converter comprising the rectifier of the frequency converter and the intermediate circuit of the frequency converter, as well as a unique power unit, the power unit being arranged between the intermediate circuit and the cooling motor in order to supply power to the cooling motor, the cooling frequency converter having a control unit connected to the power unit and controlling the same; and
   wherein the control unit of the cooling frequency converter is connected to the control part of the frequency converter for delivering the measurement information and control information received by the control part from the control part to the control unit, which comprises reception means for receiving the measurement information and the control information, and control means for producing adjustment information on the basis of the received measurement information and control information, and transmission means for transmitting this adjustment information to the power unit for controlling the same.

2. A cooling arrangement as claimed in claim 1, wherein the adjustment information is nonlinear adjustment information in order to adjust cooling nonlinearly to achieve a predetermined temperature.

3. A cooling arrangement as claimed in claim 1, wherein the cooling motor is a DC motor.

4. A cooling arrangement as claimed in claim 3, wherein the cooling motor is a permanent magnet motor.

5. A cooling arrangement as claimed in claim 1, wherein the power unit is a switched-mode power supply.

6. A cooling arrangement as claimed in claim 1, wherein the cooling motor is an AC motor.

7. A cooling arrangement as claimed in claim 6, wherein the power unit is an inverter.

8. A cooling arrangement as claimed in claim 1, wherein the adjustment information comprises a PWM control.

9. A cooling arrangement as claimed in claim 1, wherein the transfer means is a blower.

10. A cooling arrangement as claimed in claim 1, wherein the transfer means is a pump.

11. A cooling arrangement as claimed in claim 1, wherein the adjustment information is anticipatory adjustment information based on measurement information and forthcoming but already known control information.

* * * * *